United States Patent [19]

Kobayashi et al.

[11] Patent Number: 5,127,379
[45] Date of Patent: Jul. 7, 1992

[54] INTERNAL COMBUSTION ENGINE

[75] Inventors: Tatsuo Kobayashi, Susono; Norihiko Nakamura; Kenichi Nomura, both of Mishima; Hiroshi Nomura; Hiroshi Nihei, both of Susono, all of Japan

[73] Assignee: Toyota Jidosha Kabushiki Kaisha, Japan

[21] Appl. No.: 706,386

[22] Filed: May 28, 1991

[30] Foreign Application Priority Data

Jun. 26, 1990 [JP] Japan .................. 2-66816[U]
Oct. 31, 1990 [JP] Japan .................. 2-291692
Dec. 25, 1990 [JP] Japan .................. 2-405934

[51] Int. Cl.⁵ .................. F02B 19/16; F02B 23/08
[52] U.S. Cl. .................. 123/302; 123/305; 123/276; 123/661; 123/193.5
[58] Field of Search .......... 123/275, 276, 299, 300, 123/301, 302, 305, 307, 478, 480, 193 H, 308, 432, 257, 661

[56] References Cited

U.S. PATENT DOCUMENTS

| 3,498,276 | 3/1970 | Hardenberg | 123/305 X |
| 4,840,147 | 1/1989 | Tanahashi et al. | 123/65 VD |
| 4,920,937 | 5/1990 | Sasaki et al. | 123/305 |
| 4,955,339 | 9/1990 | Sasaki et al. | 123/305 X |
| 4,957,081 | 9/1990 | Ito et al. | 123/302 |

FOREIGN PATENT DOCUMENTS

| 3903842 | 9/1989 | Fed. Rep. of Germany . |
| 61-173728 | 10/1986 | Japan . |
| 62-191622 | 8/1987 | Japan . |
| 63-40527 | 3/1988 | Japan . |
| 63-189614 | 8/1988 | Japan . |
| 1-124042 | 8/1989 | Japan . |
| 1-203613 | 8/1989 | Japan . |
| 2-16360 | 1/1990 | Japan . |
| 2-28526 | 2/1990 | Japan . |
| 2-125911 | 5/1990 | Japan . |
| 2-169834 | 6/1990 | Japan . |
| 0723972 | 2/1955 | United Kingdom . |
| 9000222 | 11/1990 | World Int. Prop. O. . |

Primary Examiner—Willis R. Wolfe
Attorney, Agent, or Firm—Oliff & Berridge

[57] ABSTRACT

An internal combustion engine comprising a spark plug arranged at the center of the inner wall of the cylinder head, and a fuel injector arranged on the periphery of the inner wall of the cylinder head. A depression extending from the position beneath the spark plug to the position beneath the tip portion of the fuel injector is formed on the top face of the piston, and fuel is injected toward the depression. When the engine is operating under a heavy load, the fuel moving along the axis of injection impinges upon the concaved inner wall of the depression at substantially a right angle. When the engine is operating under a light load, the injection time is retarded, and at this time, the fuel moving along the axis of injection impinges upon the concaved inner wall of the depression at an acute angle.

38 Claims, 16 Drawing Sheets

INTERNAL COMBUSTION ENGINE

BACKGROUND OF THE INVENTION

1. Field of the Invention

The present invention relates to an internal combustion engine.

2. Description of the Related Art

In a known engine in which fuel is directly injected into the cylinder of the engine, a depression is formed on the top face of the piston, fuel is injected from the fuel injector toward the depression, a swirl motion, swirling about the axis of the cylinder, is created in the combustion chamber, and an ignitable air-fuel mixture is formed around the spark plug due to the swirl motion (see Japanese Unexamined Utility Model application No. 1-124042).

In this engine, however, such a swirl motion swirling about the axis of the cylinder must be created, and therefore, where such a swirl motion can not be created, the method of forming the air-fuel mixture around the spark plug by using the swirl motion can no longer be adopted. Further, in this engine, the strength of the swirl motion is changed in accordance with a change of the operating state of the engine. Therefore, if the formation of the air-fuel mixture around the spark plug relies completely on the swirl motion, a problem arises in that it is difficult to create a proper air-fuel mixture around the spark plug for all of the operating states of the engine.

SUMMARY OF THE INVENTION

An object of the present invention is to provide an engine capable of forming a proper air-fuel mixture around the spark plug, regardless of the load under which the engine is running.

Therefore, according to the present invention, there is provided an internal combustion engine comprising: a cylinder head having an inner wall; a spark plug arranged on a central portion of the inner wall of the cylinder head; a fuel injector arranged on a peripheral portion of the inner wall of the cylinder head; a piston having a top face having a depression formed therein and extending from a point beneath the spark plug to a point beneath a tip portion of the fuel injector, fuel being injected from the fuel injector toward a concaved inner wall of the depression; and a control means for controlling an injection time of the fuel injector in response to an engine load, to thereby inject fuel at a time at which fuel injected by the fuel injector and moving along an axis of the injection impinges upon the concaved inner wall of the depression at substantially a right angle when the engine is operating under a heavy load, and to retard the injection time and inject fuel at a time at which the fuel injected by the fuel injector and moving along the axis of injection impinges obliquely upon the concaved inner wall of the depression at an acute angle, to cause the impinged fuel to flow along the concaved inner wall of the depression toward the point beneath the spark plug, due to the inertia thereof, when the engine is operating under a light load.

The present invention may be more fully understood from the description of preferred embodiments of the invention set forth below, together with the accompanying drawings.

DESCRIPTION OF THE PREFERRED EMBODIMENTS

Figure 1:
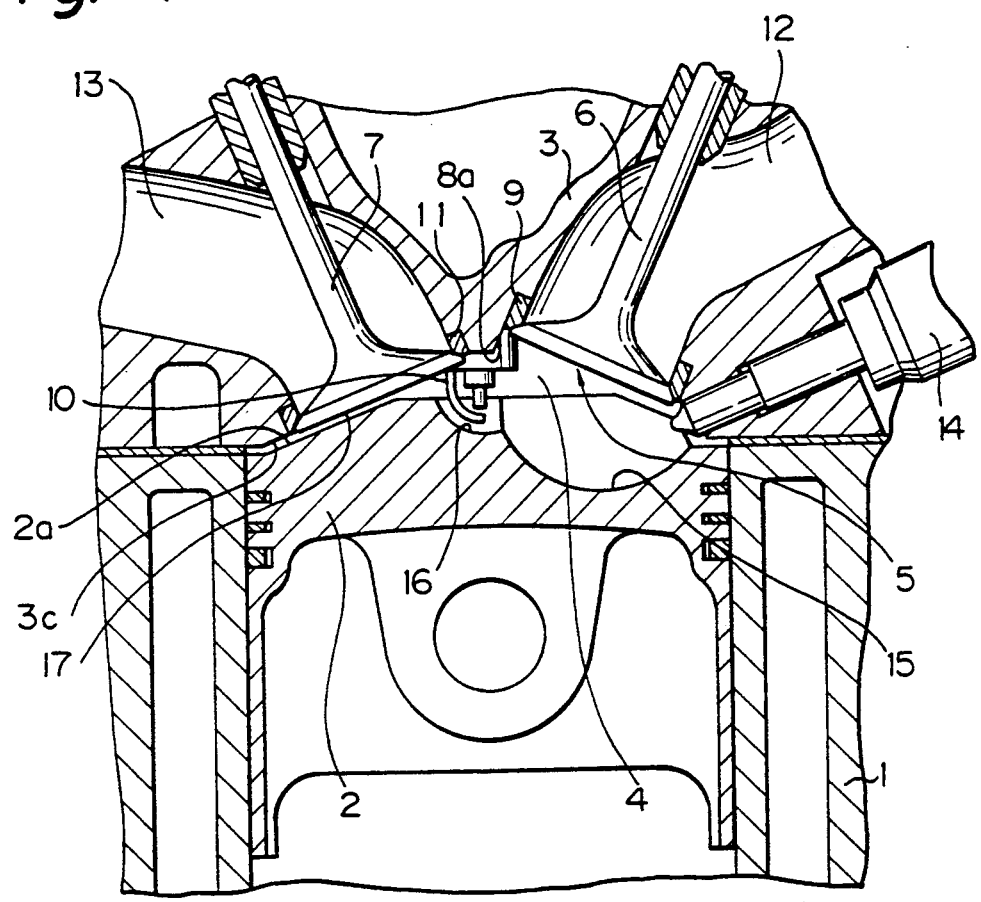
FIG. 1 is a cross-sectional side view of a two-stroke engine.
Figure 2:
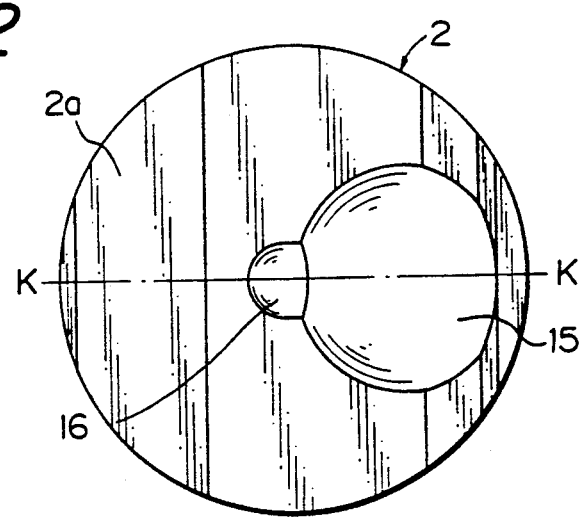
FIG. 2 is a plan view of a piston.
Figure 3:
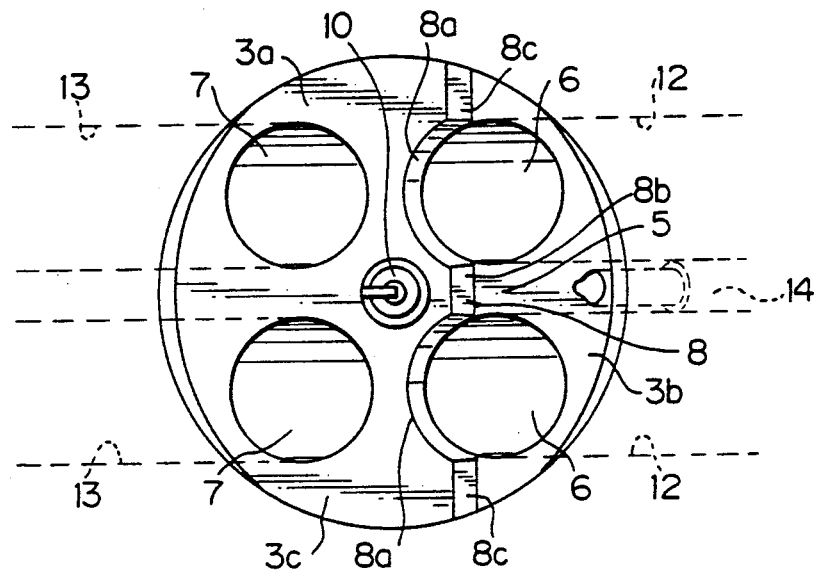
FIG. 3 is a view illustrating an inner wall of a cylinder head.

Referring to FIGS. 1 through 3, reference numeral 1 designates a cylinder block, 2 a piston reciprocally movable in the cylinder block 1, 3 a cylinder head fixed onto the cylinder block 1, and 4 a combustion chamber formed between the inner wall 3a of the cylinder head 3 and the top face of the piston 2. A depression 5 is formed on the inner wall 3a of the cylinder head 3, and a pair of intake valves 6 are arranged on the inner wall portion 3b of the cylinder head 3, which forms the bottom wall of the depression 5. The inner wall portion 3c of the cylinder head 3 other than the depression 5 is substantially flat and inclined, and a pair of exhaust valves 7 are arranged on this inner wall portion 3c of the cylinder head 3. The inner wall portions 3b and 3c of the cylinder head 3 are interconnected via the peripheral wall 8 of the depression 5. The peripheral wall 8 of the depression 5 comprises masking walls 8a arranged as close as possible to the peripheral portions of the corresponding intake valves 6 and extending archwise along the periphery of the corresponding intake valves 6, a fresh air guide wall 8b arranged between the intake valves 6, and fresh air guide walls 8c each arranged between the circumferential wall of the inner wall 3a of the cylinder head 3 and the corresponding intake valve 6. The masking walls 8a extend toward the combustion chamber 4 to a position lower than the intake valves 6 when the valves 6 are in the maximum lift position, and thus the valve opening between the valve seat 9 and the peripheral portion of the intake valve 6, which is located on the exhaust valve side, is masked by the corresponding masking wall 8a for the entire time for which the intake valve 6 is open. The fresh air guide wall 8b and the fresh air guide walls 8c are located on substantially the same plane and extend substantially in parallel to the line passing through the centers of the intake valves 6. The spark plug 10 is arranged on the inner wall portion 3c of the cylinder head 3 in such a manner that it is located at the center of the inner wall 3a of the cylinder head 3.

Intake ports 12 are formed in the cylinder head 3 for the intake valves 6, and exhaust ports 13 are formed in the cylinder head 3 for the exhaust valves 7. A fuel injector 14 is arranged at the periphery of the inner wall 3a of the cylinder head 3, between the intake valves 6, and fuel is injected from the fuel injector 14 toward the combustion chamber 4.

As illustrated in FIGS. 1 and 2, a depression 15 extending from a point beneath the spark plug 10 to a point beneath the tip portion of the fuel injector 14 is formed on the top face of the piston 2. In the embodiment illustrated in FIGS. 1 and 2, the depression 15 has a substantially spherical shape, which is symmetrical with respect to the vertical plane K—K including the spark plug 10 and the fuel injector 14. Further, a recessed portion 16 is formed on the central portion of the top face of the piston 2 and has a spherical shape having a radius of curvature which is smaller than that of the depression 15. The recessed portion 16 is also arranged in the vertical plane K—K and opens to the upper interior of the depression 15. As illustrated in FIG. 1, when the piston 2 reaches top dead center (TDC), the spark plug 16 enters the recessed portion 16. The top face portion 2a of the piston 2 positioned opposite to the depression 15 with respect to the recessed portion 16 is substantially flat and inclined so that, when the piston 2 reaches TDC as illustrated in FIG. 1, a squish area 17 is formed between the inner wall portion 3c of the cylinder head 3 and the top face portion 2a of the piston 2.

Figure 4:
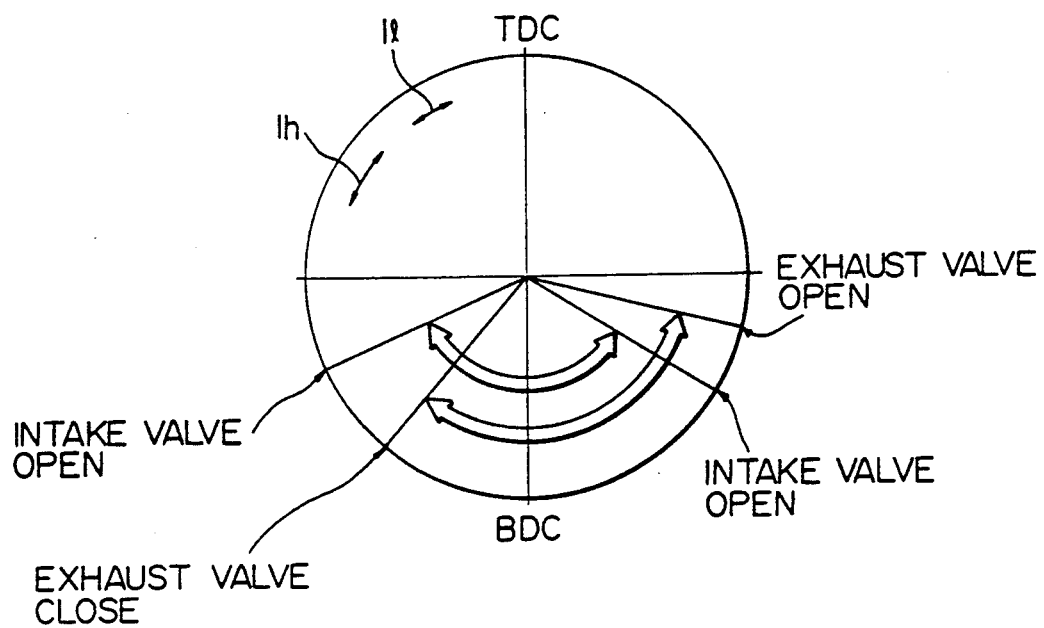
FIG. 4 is a diagram illustrating the opening time of an intake valve and an exhaust valve.

In the embodiment illustrated in FIGS. 1 through 3, as illustrated in FIG. 4, the exhaust valves 7 open earlier than the intake valves 6, and the exhaust valves 7 close earlier than the intake valves 6. In addition, in FIG. 4, $I_l$ indicates the fuel injection time set when the engine is operating under a light load, and $I_h$ indicates the fuel injection time set when the engine is operating under a heavy load. Consequently, in the embodiment illustrated in FIGS. 1 through 3, the fuel injection time is advanced as the engine load becomes heavier.

Figure 5A:
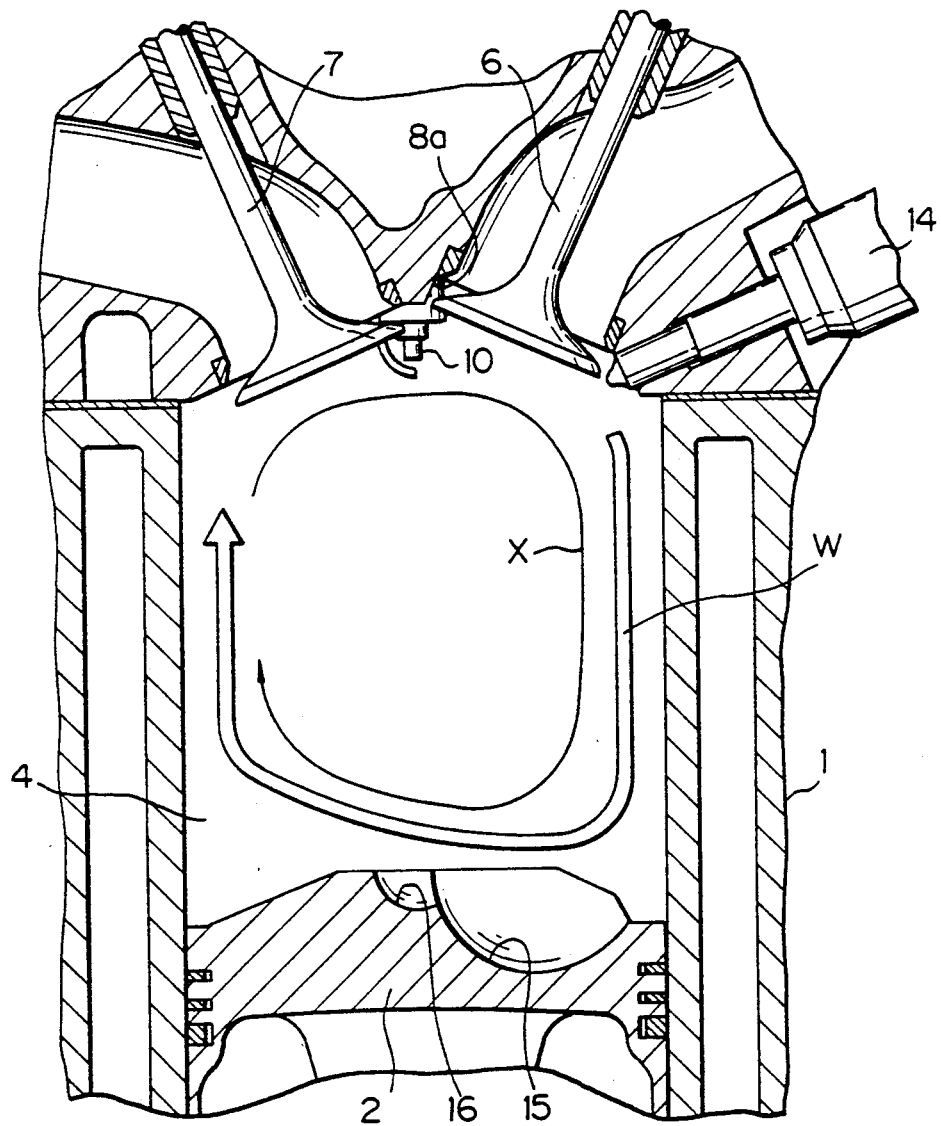
FIGS. 5A through 5E are cross-sectional side views of the engine, illustrating the operation thereof.

As illustrated in FIG. 5A, when the intake valves 6 and the exhaust valves 7 are open, fresh air flows into the combustion chamber 4 via the intake valves 6. At this time, since the valve openings of the intake valves 6, which openings are located on the exhaust valve side, are masked by the masking walls 8a, the fresh air flows into the combustion chamber 4 from the valve openings of the intake valves 6, which openings are located on the opposite side of the masking walls 8a. Then, as illustrated by the arrow W in FIG. 5A, the fresh air flows downward along the inner wall of the cylinder, located beneath the intake valves 6 and then moves forward along the top face of the piston 2 and flows upward along the inner wall of the cylinder, located beneath the exhaust valves 7. Thus, the fresh air flows within the combustion chamber 4 in the form of a loop. The burned gas in the combustion chamber 4 is discharged via the exhaust valves 7 by the air stream W flowing in the form of a loop manner, and a swirl motion X swirling in a vertical plane is created in the combustion chamber 4 by the airstream W flowing in the form of a loop. Then, the piston 2 passes through the bottom dead center (BDC) and starts to move upward. Thereafter, the intake valves 6 and the exhaust valves 7 are closed, and the injection of fuel by the fuel injector 14 is then carried out.

Figure 5B:
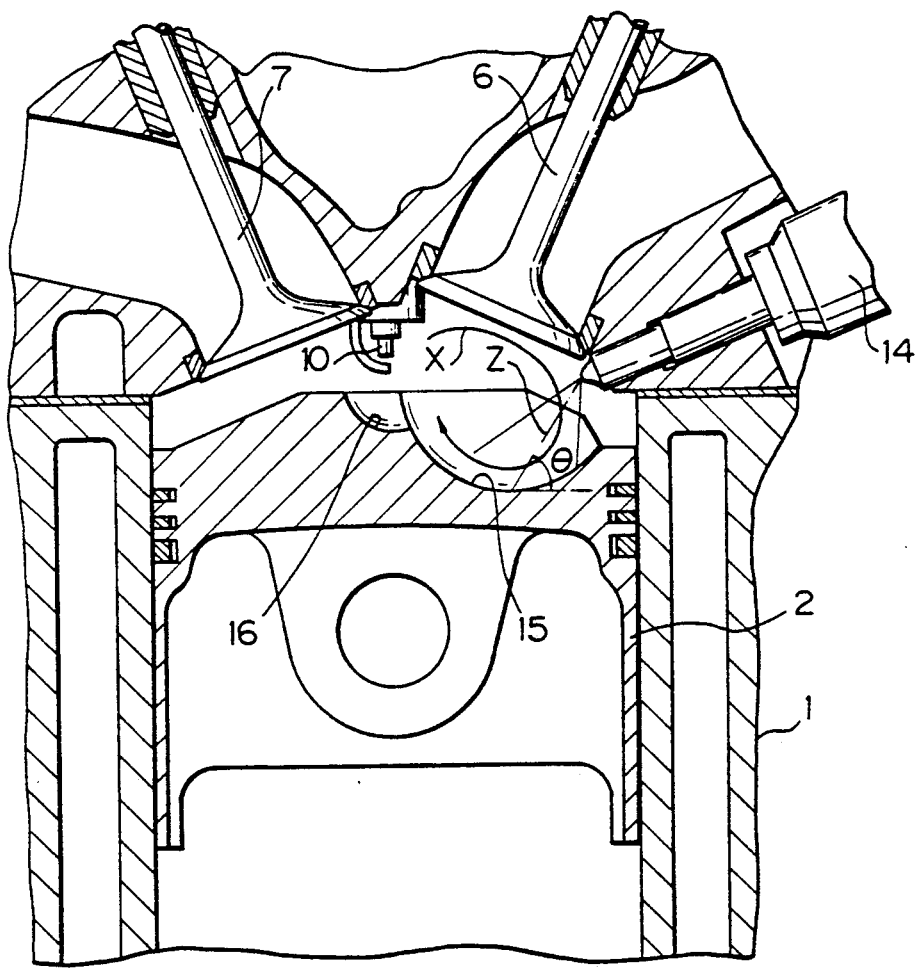
Figure 5C:
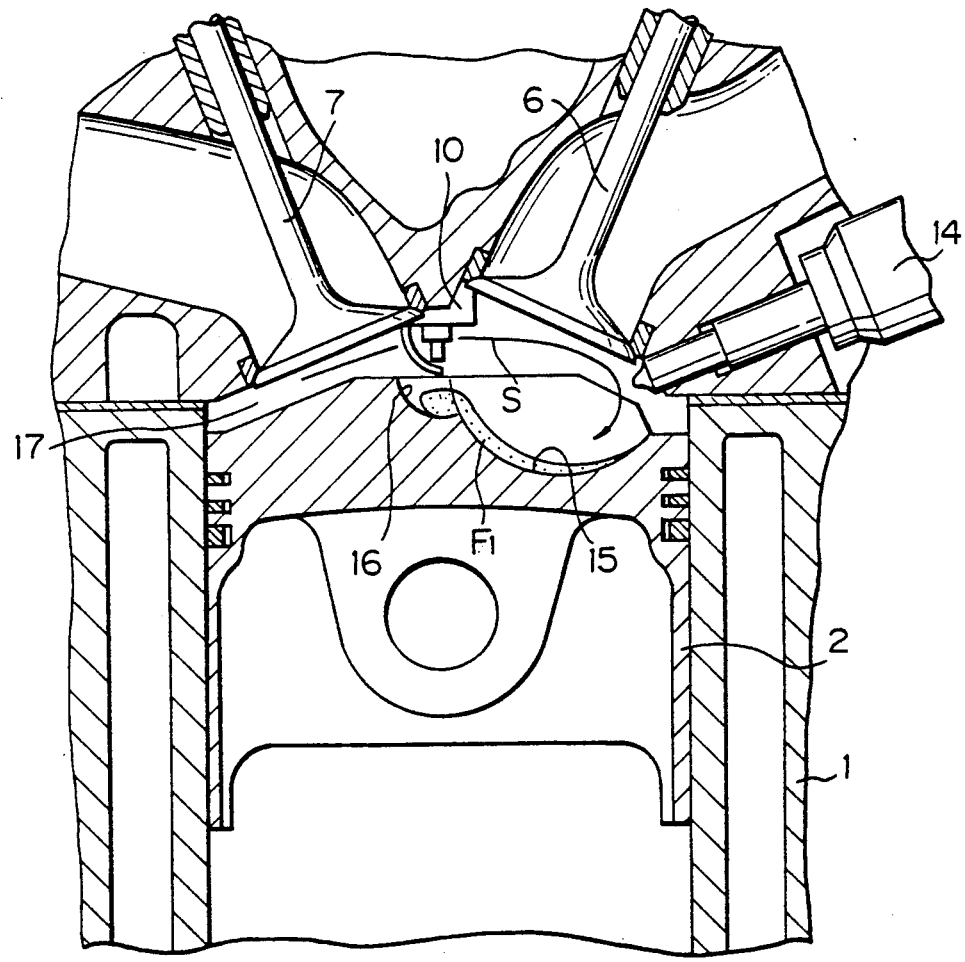
Figure 5D:
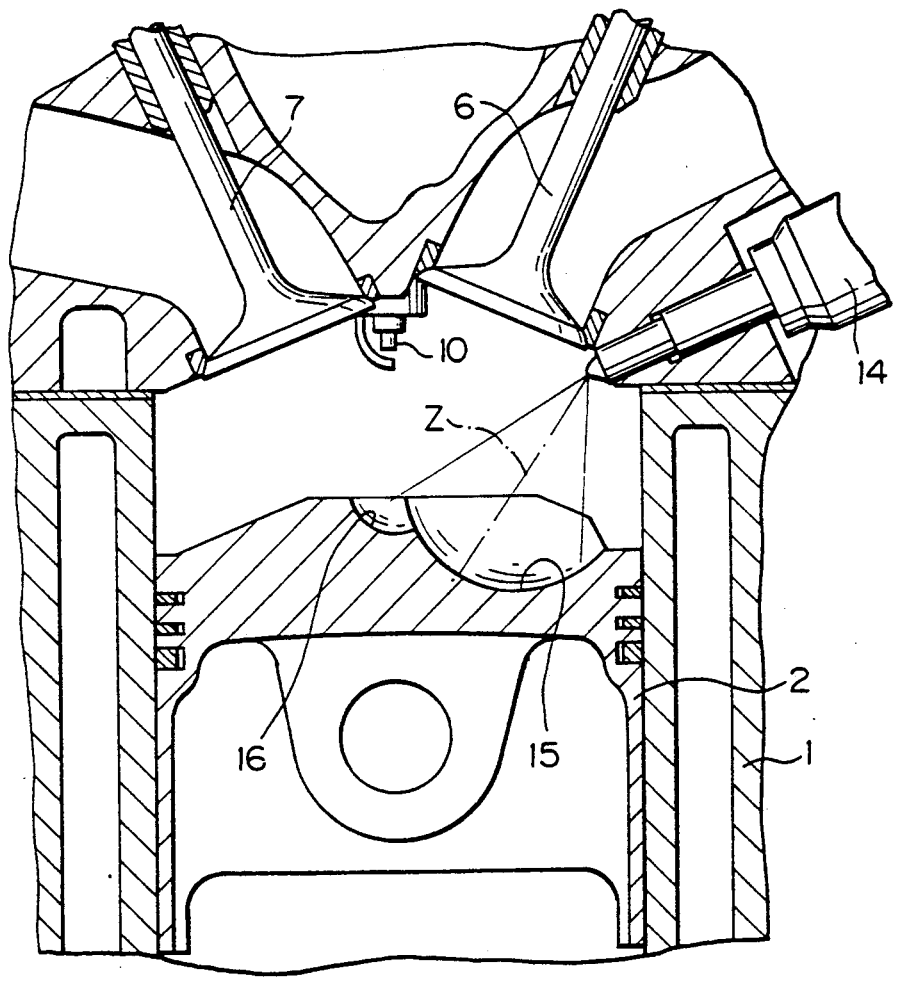
Figure 5E:
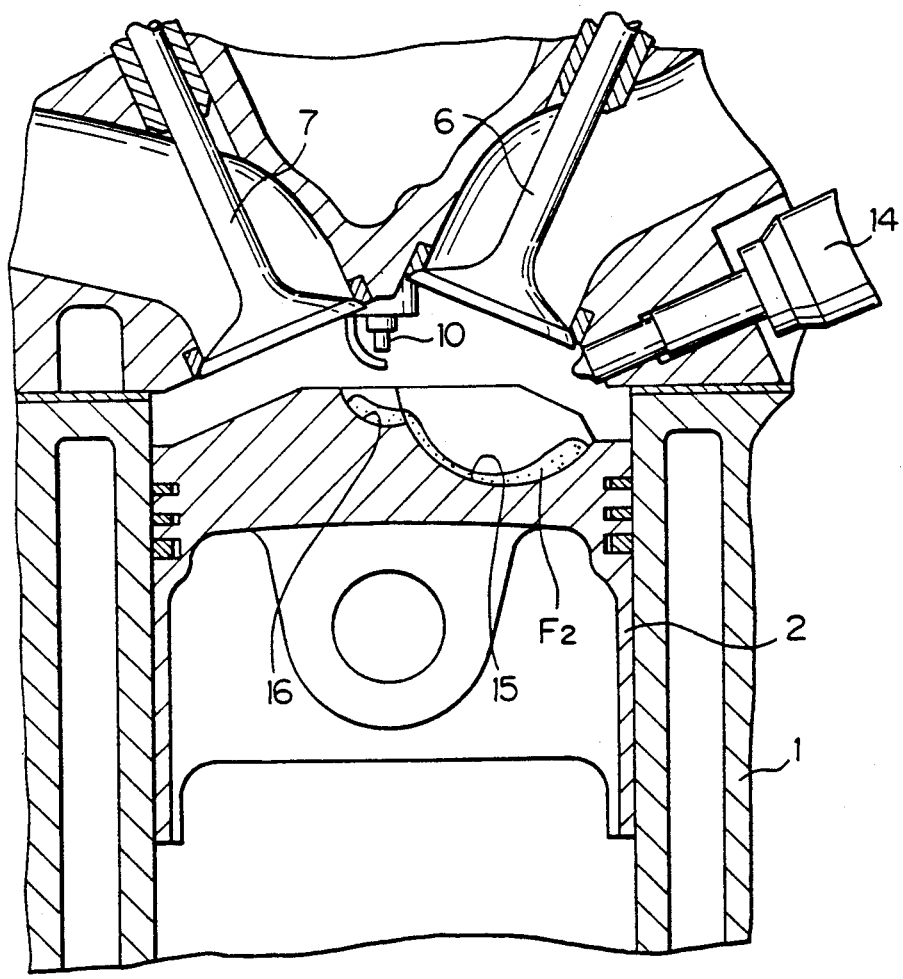

Next, the fuel injection method will be described with reference to FIGS. 5B through 5E. FIGS. 5B and 5C illustrate the case wherein the engine is operating under a light load, and FIGS. 5D and 5E illustrate the case wherein the engine is operating under a heavy load.

Fuel is injected from the fuel injector 14 toward the concaved inner wall of the depression 15, as illustrated by FIG. 5B. In the embodiment illustrated in FIGS. 1 through 3, the spray of the injected fuel has, for example, a conical shape as illustrated in FIG. 5(B), and the axis of injection Z of the fuel is positioned in the vertical plane K—K illustrated in FIG. 2.

When the engine is operating under a light load, the injected fuel moving forward along the axis of injection Z impinges obliquely upon the concaved inner wall of the depression 15 at an acute angle $\theta$, as illustrated by FIG. 5B. When the injected fuel impinges obliquely upon the concaved inner wall of the depression 15, the fuel moves forward, while being vaporized, to the region beneath the spark plug 10 along the concaved inner wall of the depression 15 due to the inertia thereof, as illustrated by the arrow $F_1$ in FIG. 5C, and the fuel is then introduced into the recessed portion 16. When the engine is operating under a light load, the amount of fuel injected by the fuel injector 14 is small, but at this time, since a large part of the injected fuel is carried to the region beneath the spark plug 10, an ignitable air-fuel mixture is formed around the spark plug 10.

In addition, the swirl motion X created in the combustion chamber 4 as illustrated in FIG. 5A is gradually attenuated, and the radius of the swirl motion X becomes smaller as the piston 2 moves upward. This swirl motion X becomes the swirl motion X, which flows along the concaved inner wall of the depression 15 as illustrated in FIG. 5B, when the piston 2 approaches TDC. The swirl motion X provides the force which causes the injected fuel to move to the region beneath the spark plug 10, and further, when the piston 2 moves closer to TDC, the squish flow is spouted from the squish area 17 as illustrated by the arrow S in FIG. 5C, and this squish flow S also flows along the concaved inner wall of the depression 15. Consequently, this squish flow S also provides a force which causes the injected fuel to move to the region beneath the spark plug 10. Furthermore, the fuel moving to the region beneath the spark plug 10 along the concaved inner wall of the depression 15 is atomized by the swirl motion X and the squish flow S, and thus an ignitable air-fuel mixture which has been fully atomized is collected around the spark plug 10. Consequently, even when the amount of fuel injected by the fuel injector 14 is small, because the engine is operating under a light load, a good ignition and a subsequent good combustion can be obtained.

As mentioned above, when the engine is operating under a heavy load, the injection time is advanced, compared with when the engine is operating under a light load, and therefore, as illustrated in FIG. 5D, the injection of fuel is started when the piston 2 is in a lower position, than when the engine is operating under a light load. At this time, as illustrated in FIG. 5D, the injected fuel moves forward along the axis of injection Z and impinges upon the concaved inner wall of the depression 15 at substantially a right angle. When the injected fuel impinges upon the concaved inner wall of the depression 15 at substantially a right angle, the fuel spreads along the concaved inner wall of the depression 15 in all directions from the point of impingement of the fuel moving along the axis of injection Z, as illustrated by $F_2$ in FIG. 5E, and in this case, a part of the fuel, which has impinged upon the concaved inner wall of the depression 15, moves to the region beneath the spark plug 10 and is then introduced into the recessed portion 16.

As mentioned above, when the amount of fuel injected by the fuel injector 14 is large, because the engine is operating under a heavy load, since a part of the injected fuel is introduced around the spark plug 10, the air-fuel mixture formed around the spark plug 10 does not become excessively rich, and thus an easily ignitable air-fuel mixture is formed around the spark plug 10. Also, when the engine is operating under a heavy load, since the injected fuel is distributed on the concaved inner wall of the depression 15, over a wide range thereof, the vaporization of the injected fuel is promoted, and since the injection time is advanced, a sufficient time for the fuel to be vaporized is given to the injected fuel. As a result, even when the engine is operating under a heavy load, and thus the amount of fuel injected by the fuel injector 14 is large, the vaporization of the entire injected fuel is efficiently promoted. Furthermore, when the engine is operating under a heavy load, both the swirl motion X as illustrated in FIG. 5B, and the squish flow S as illustrated in FIG. 5C, are also generated, and thus the vaporization of the injected fuel is further promoted by the swirl motion X and squish flow S.

Figure 6:
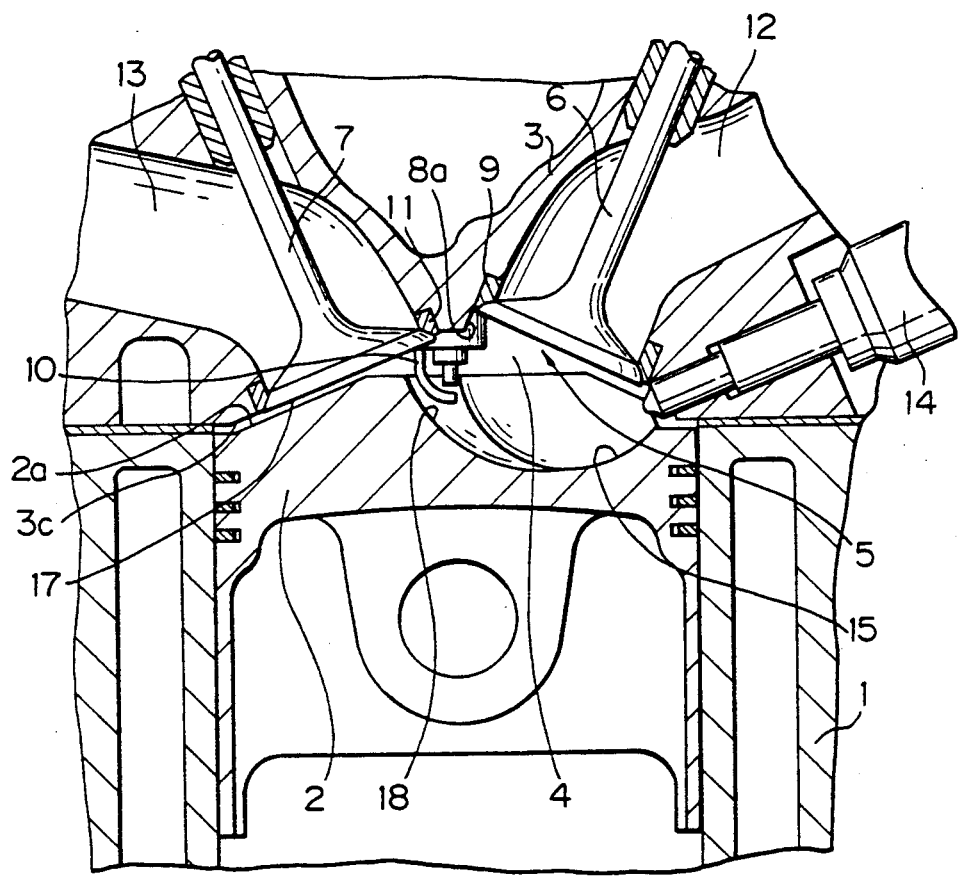
FIG. 6 is a cross-sectional side view of the engine, illustrating a second embodiment of the present invention.
Figure 7:
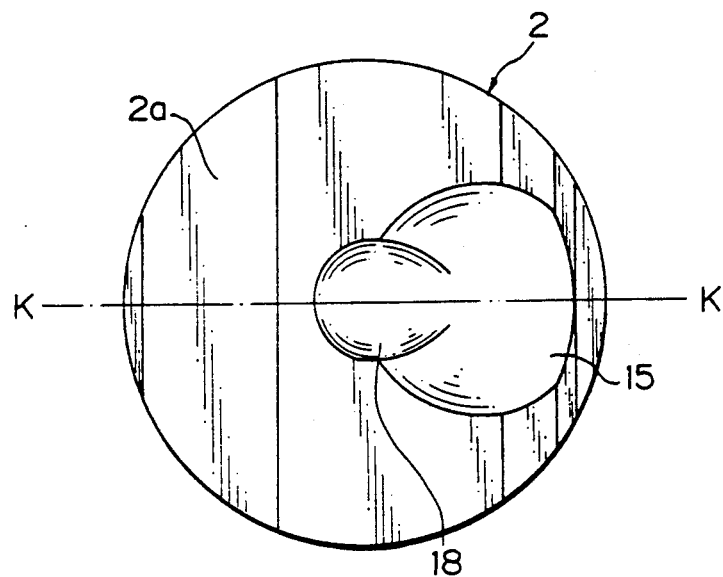
FIG. 7 is a plan view of the piston.
Figure 8:
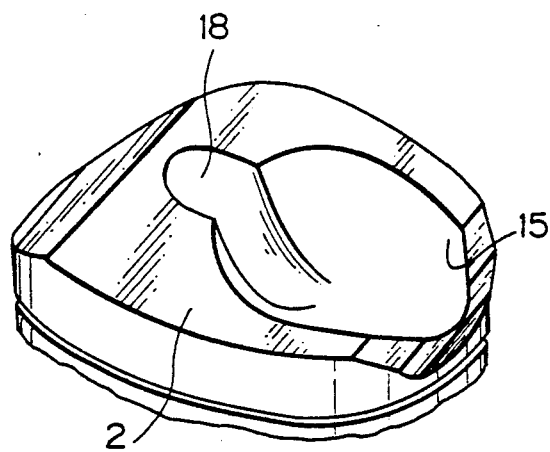
FIG. 8 is a perspective view of the top portion of the piston.

FIGS. 6 through 8 illustrate a second embodiment. In this embodiment, similar components are indicated by the same reference numerals used in FIGS. 1 through 3.

As illustrated in FIGS. 6 through 8, in this embodiment a fuel guide groove 18 is formed on the concaved inner wall of the depression 15. This fuel guide groove 18 extends archwise from the lowermost bottom portion of the concaved inner wall of the depression 15 to the top face of the piston 2, which is located beneath the spark plug 10. As can be seen from FIG. 6, the bottom wall of the fuel guide groove 18 is smoothly connected to the concaved inner wall of the depression 15. Also, the fuel guide groove 18 has a substantially semi-circular cross-sectional shape which is symmetric with respect to the vertical plane K—K. Therefore, when the piston 2 reaches TDC as illustrated in FIG. 6, the spark plug 10 enters the upper portion of the fuel guide groove 18.

Figure 9:
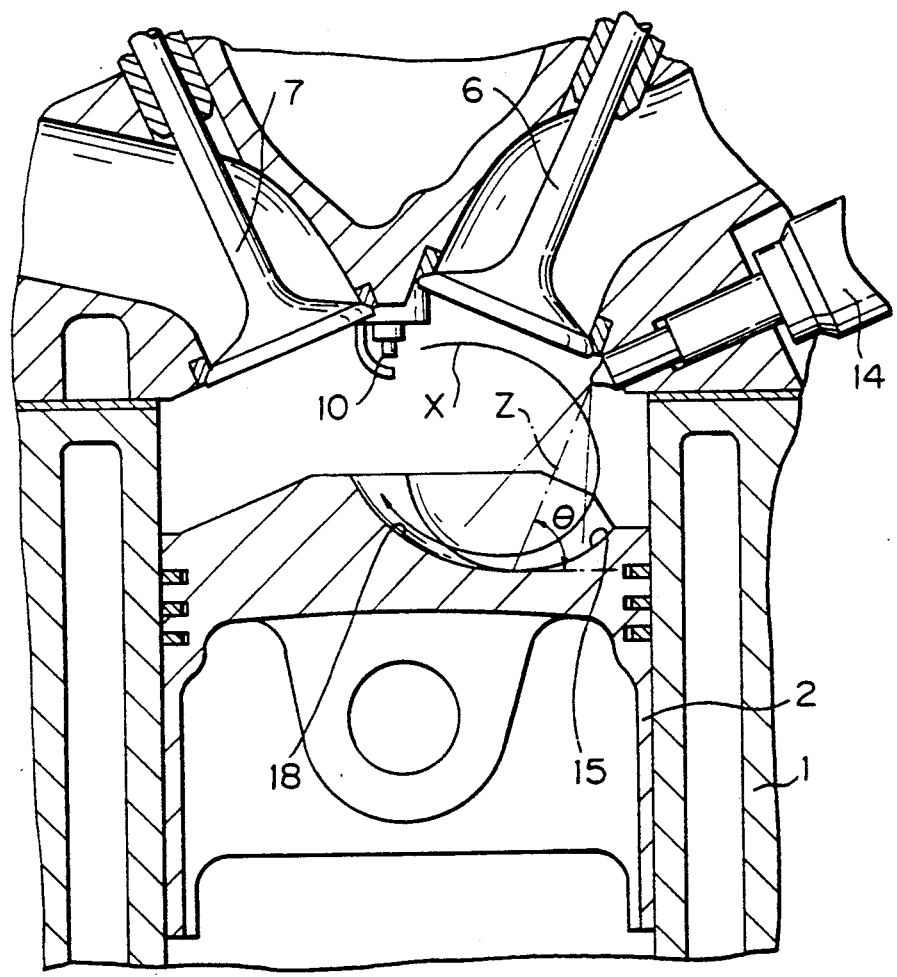
FIGS. 9 and 10 are cross-sectional side views of the engine, illustrating the operations thereof.
Figure 10:
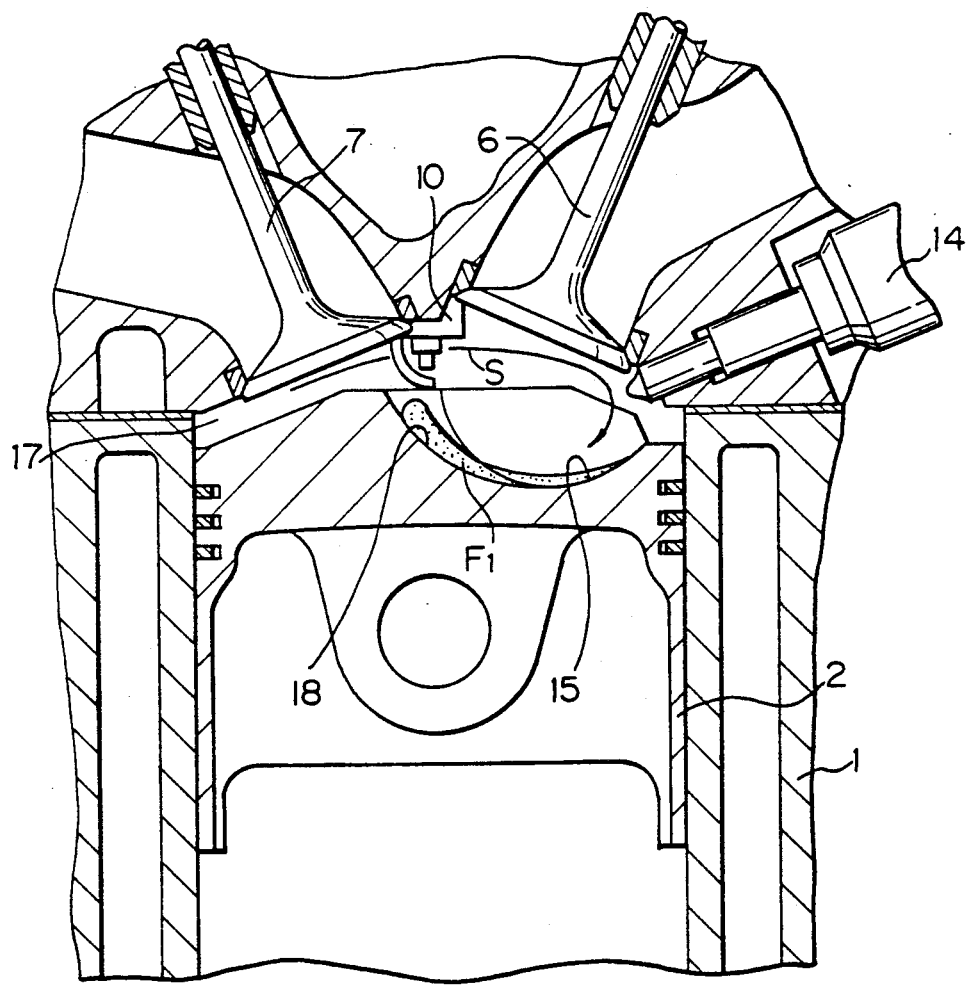

Also in this embodiment, as illustrated in FIG. 9, when the engine is operating under a light load, the injected fuel, moving forward along the axis of injection Z impinges obliquely upon the concaved inner wall of the depression 15, and after the fuel has impinged upon the concaved inner wall of the groove 15, the fuel flows into the fuel guide groove 18 due to the inertia thereof. Then, the fuel is guided by the fuel guide groove 18 and moves to the upper portion of the fuel guide groove 18, as illustrated by $F_1$ in FIG. 10.

In this embodiment, by forming the fuel guide groove 18 on the concaved inner wall of the depression 15, even when the amount of fuel injected by the fuel injector 14 is small, it is possible to collect a large part of the injected fuel in the upper portion of the fuel guide groove 18. Therefore, a good ignition can be obtained even when the engine is operating under a light load.

Figure 11:
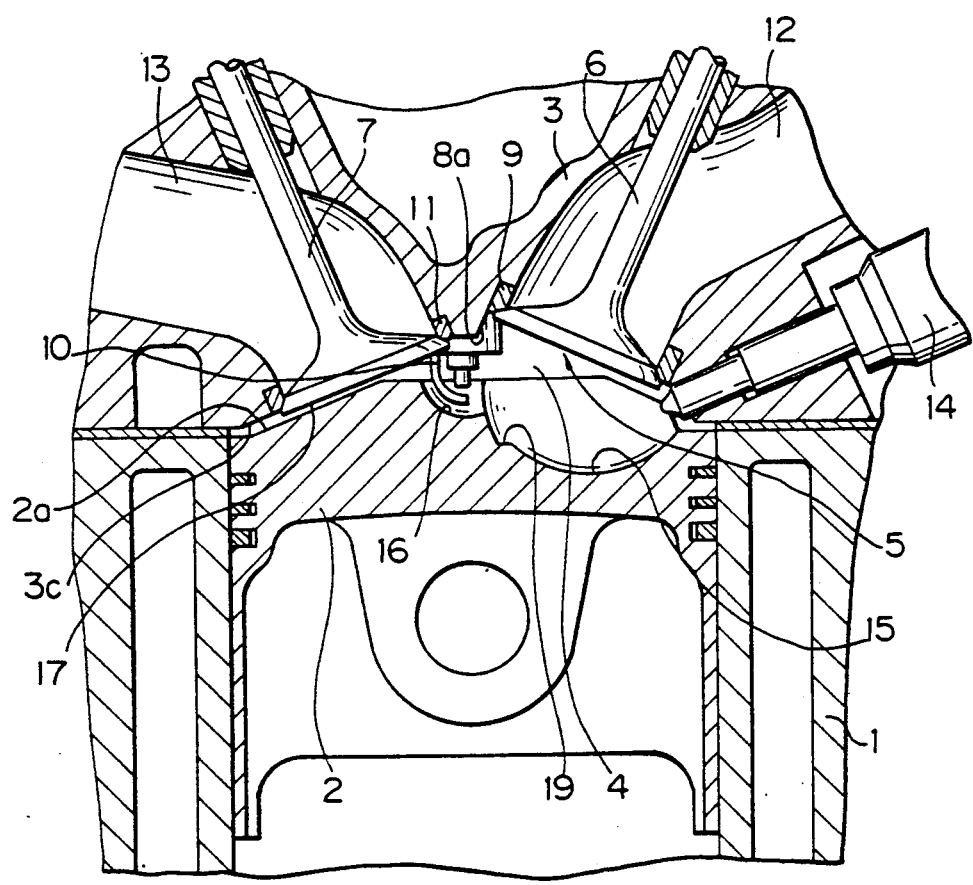
FIG. 11 is a cross-sectional side view of the engine, illustrating a third embodiment of the present invention.
Figure 12:
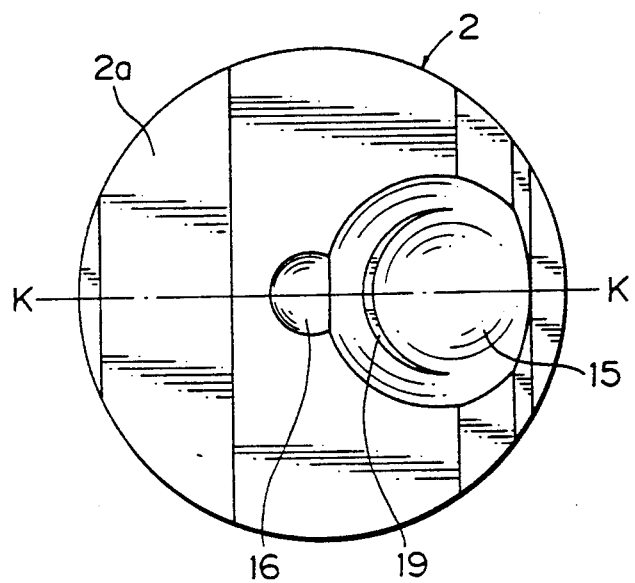
FIG. 12 is a plan view of the piston.
Figure 13:
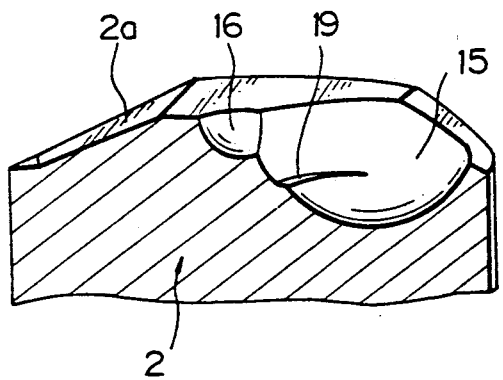
FIG. 13 is a cross-sectional side view of the top portion of the piston.

FIGS. 11 through 13 illustrate a third embodiment. In this embodiment, similar components are indicated by the same reference numerals used in FIGS. 1 through 3.

As illustrated in FIGS. 11 through 13, in this embodiment, a step portion 19 is formed on the concaved inner wall of the depression 15 between the recessed portion 16 and the lowermost bottom portion of the concaved inner wall of the depression 15. As can be seen from FIGS. 12 and 13, this step portion 19 extends archwise around the lowermost bottom portion of the depression 15.

Figure 14:
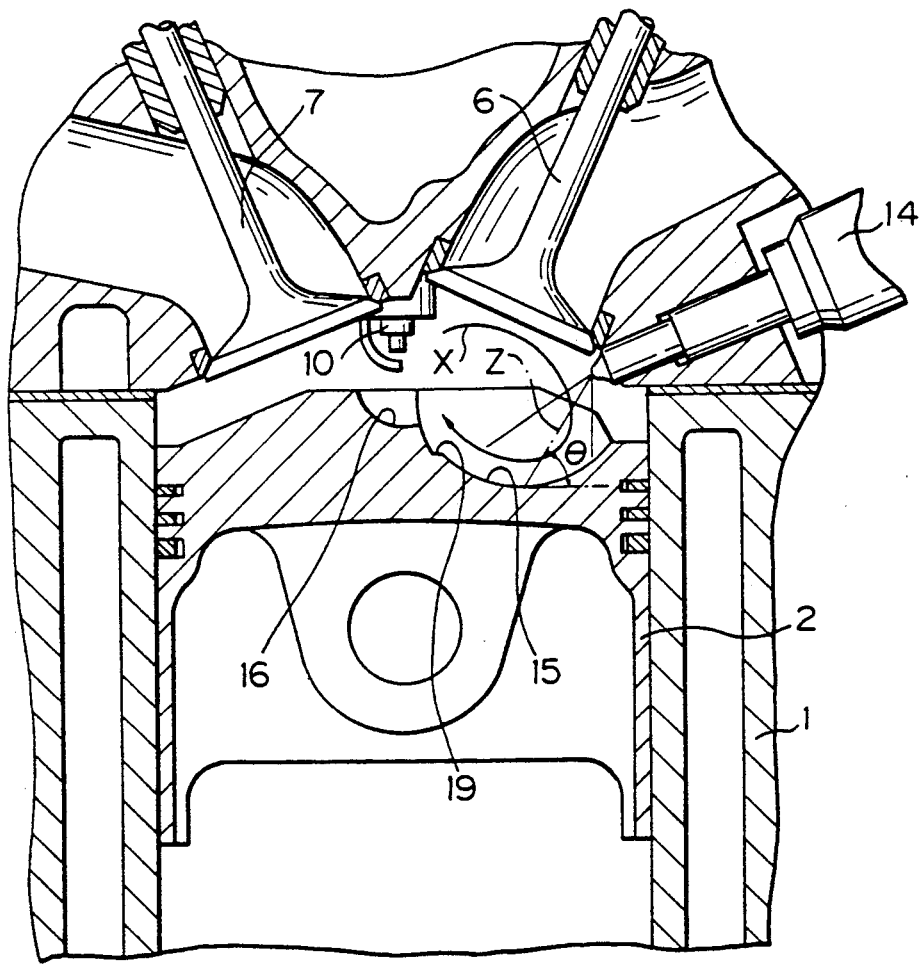
FIGS. 14 and 15 are cross-sectional side views of the engine, illustrating the operations thereof.
Figure 15:
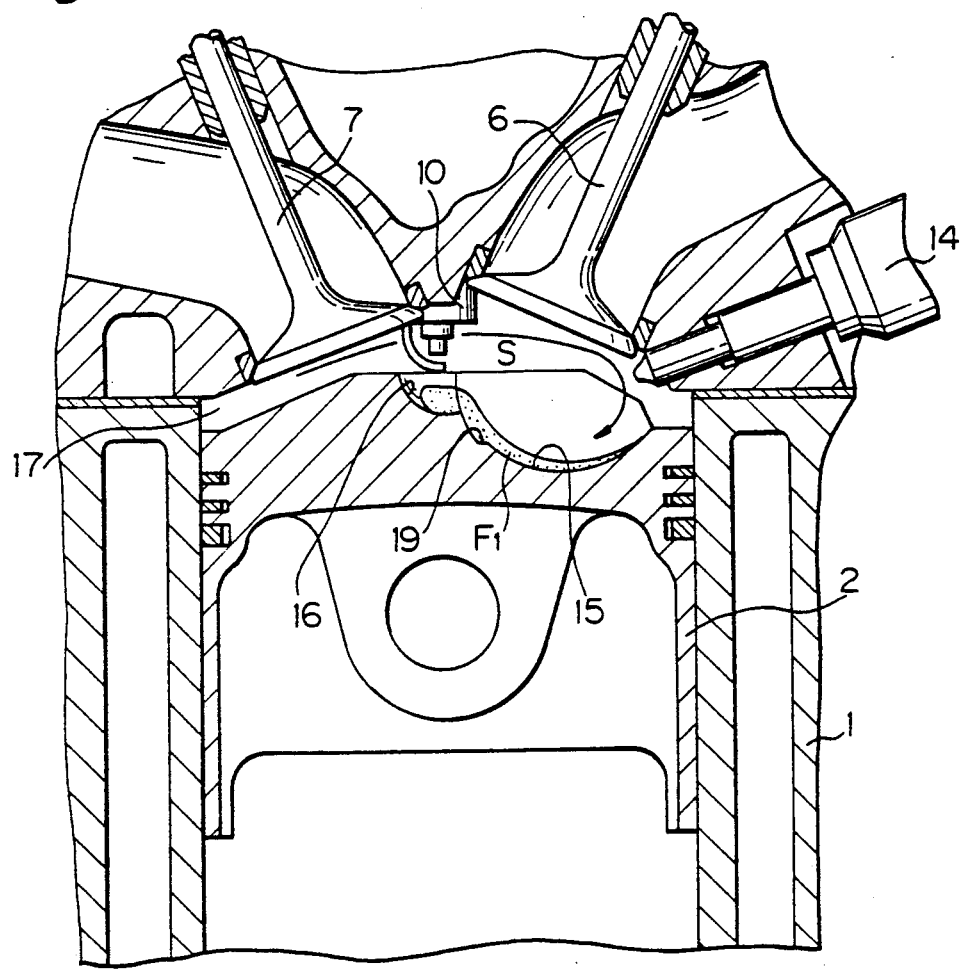

Also in this embodiment, as illustrated in FIG. 14, when the engine is operating under a light load, the injected fuel, moving forward along the axis of injection Z and impinges obliquely upon the concaved inner wall of the depression 15. After the fuel impinges upon the concaved inner wall of the depression 15, the fuel flows toward the recessed portion 16 due to the inertia thereof, as illustrated by $F_1$ in FIGS. 15 and 16, and then passes through the step portion 19. At this time, the fuel F is separated from the concaved inner wall of the depression 15 as illustrated by $F_2$ in FIG. 16, and thus the fuel $F_1$ is divided into fine particles, whereby the vaporization of the fuel $F_1$ is promoted. In addition, the heat of the inner edge of the step portion 19 can not easily escape, and thus the inner edge of the step portion 19 is maintained at a high temperature. Therefore, when the fuel $F_1$ passes through the step portion 19, the fuel $F_1$ receives the heat from the inner edge of the step portion 19, and thus the vaporization of the fuel $F_1$ is further promoted. In addition, when the swirling stream X and the squish flow S pass through the step portion 19, an air turbulence is created downstream of the step portion 19 as illustrated by T in FIG. 16, and due to this air turbulence, the mixing of air and the vaporized fuel is promoted. As a result, since sufficient vaporized fuel is collected in the recessed portion 16, a good ignition can be obtained. This also occurs when the engine is operating under a heavy load.

Figure 17:
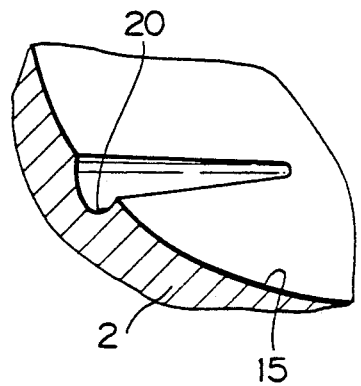
FIG. 17 is an enlarged cross-sectional side view of a portion of the piston, illustrating a modification of the piston.
Figure 18:
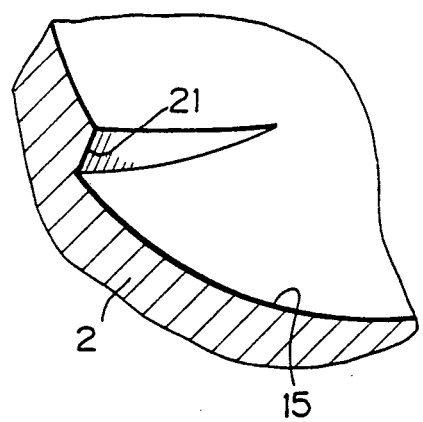
FIG. 18 is an enlarged cross-sectional side view of a portion of the piston, illustrating another modification of the piston.

FIGS. 17 and 18 illustrate separate modifications of the third embodiment.

Figure 16:
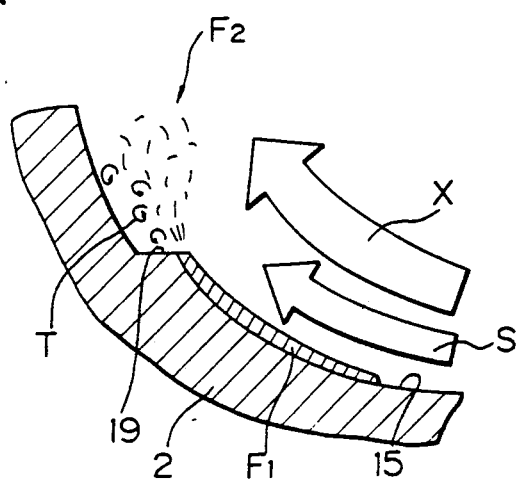
FIG. 16 is an enlarged cross-sectional view of a portion of the piston illustrated in FIGS. 11 through 13.

In the modification illustrated in FIG. 17, a groove 20 is formed on the concaved inner wall of the depression 15 at a position which is the same as that of the step portion 19 illustrated in FIG. 16. The groove 20 also extends archwise around the lowermost bottom portion of the concaved inner wall of the depression 15.

In the modification illustrated in FIG. 18, a step portion 21 is formed on the concaved inner wall of the depression 15 at a position which is the same as that of the step portion 19 illustrated in FIG. 16. The step portion 21 also extends archwise around the lowermost bottom portion of the concaved inner wall of the depression 15.

In these modifications, when the fuel passes through the groove 20 or the step portion 21, the vaporization of the fuel is promoted, and the mixing of air and fuel is enhanced.

The present invention has been described on the basis of a two-stroke engine, but the present invention also may be applied to a four-stroke engine in which fuel is directly injected into the cylinder of the engine.

According to the present invention, it is possible to form a required air-fuel mixture around the spark plug, regardless of the load under which the engine is running.

While the invention has been described by reference to specific embodiments chosen for purposes of illustration, it should be apparent that numerous modifications could be made thereto by those skilled in the art without departing from the basic concept and scope of the invention.

We claim:

1. An internal combustion engine comprising:
   a cylinder head having an inner wall;
   a spark plug arranged at a central portion of the inner wall of said cylinder head;
   a fuel injector arranged on a peripheral portion of the inner wall of said cylinder head;
   a piston having a top face having a depression extending from a point beneath said spark plug to a point beneath a tip portion of said fuel injector, fuel being injected from said fuel injector toward a concaved inner wall of said depression and the concaved inner wall of said depression having a step portion formed thereon between a lowermost bottom portion of the concaved inner wall of said depression and an upper edge of said depression which is located beneath said spark plug; and
   control means for controlling an injection time of said fuel injector in response to an engine load, to inject fuel at a time at which fuel injected by said fuel injector and moving along an axis of injection impinges upon the concaved inner wall of said depression at substantially a right angle when the engine is operating under a heavy load, and to retard the injection time and inject fuel at a time at which said fuel injected by said fuel injector and moving along said axis of injection impinges obliquely upon the concaved inner wall of said depression at an acute angle, to thereby cause an impinged fuel to flow along the concaved inner wall of said depression toward the point beneath said spark plug due to an inertial thereof when the engine is operating under a light load.

2. An internal combustion engine according to claim 1, wherein said step portion extends archwise around the lowermost bottom portion of the concaved inner wall.

3. An internal combustion engine according to claim 1, wherein the top face of said piston and the inner wall of said cylinder head defines a squish area therebetween on an opposite side of said depression.

4. An internal combustion engine according to claim 1, further comprising: a pair of intake valves symmetrically arranged on the inner wall of said cylinder head with respect to a vertical plane including both said spark plug and said fuel injector; exhaust valve means arranged on the inner wall of said cylinder head; and a pair of masking walls each being formed on the inner wall of said cylinder head and arranged between said corresponding intake valve and said exhaust valve means to mask a valve opening formed between a valve seat and a peripheral portion of said corresponding intake valve, which is located on said exhaust valve means side, for the entire time for which said corresponding intake valve is open, said masking walls being symmetrically arranged with respect to said vertical plane.

5. An internal combustion engine according to claim 4, wherein said exhaust valve means comprises a pair of exhaust valves symmetrically arranged with respect to said vertical plane.

6. An internal combustion engine according to claim 4, wherein each of said masking walls is arranged close to peripheral portion of said corresponding intake valve, which is located on said exhaust valve means side, and extends downward, toward said piston to a position lower than said corresponding intake valve when said corresponding intake valve is in the maximum lift position thereof.

7. An internal combustion engine according to claim 6, wherein each of said masking walls extends in an arc along the peripheral portion of said corresponding intake valve.

8. An internal combustion engine according to claim 1, wherein the concaved inner wall of said depression has a substantially spherical shape.

9. An internal combustion engine according to claim 8, wherein the concaved inner wall of said depression has a symmetrical shape with respect to a vertical plane including both said spark plug and said fuel injector.

10. An internal combustion engine according to claim 9, wherein said axis of injection is located in said vertical plane.

11. An internal combustion engine according to claim 9, wherein the top face of said piston has therein a recessed portion which is located in said vertical plane beneath said spark plane, and said recessed portion is open to an upper interior of said depression.

12. An internal combustion engine according to claim 11, wherein said recessed portion has a substantially spherical shape having a radius of curvature which is smaller than that of said depression.

13. An internal combustion engine according to claim 11, wherein said spark plug enters said recessed portion when said piston reaches top dead center.

14. An internal combustion engine comprising:
    a cylinder head having an inner wall;
    a spark plug arranged at a central portion of the inner wall of said cylinder head;
    a fuel injector arranged on a peripheral portion of the inner wall of said cylinder head;
    a piston having a top face having a depression extending from a point beneath said spark plug to a point beneath a tip portion of said fuel injector, fuel being injected from said fuel injector toward a spherically concaved inner wall of said depression and the spherically concaved inner wall of said depression is symmetrical with respect to a vertical plane including both said spark plug and said fuel injector and has therein a groove extending from a lowermost bottom portion of the spherically concaved inner wall to a position underneath said spark plug along said vertical plane; and
    control means for controlling an injection time of said fuel injector in response to an engine load, to inject fuel at a time at which fuel injected by said fuel injector and moving along an axis of injection impinges upon the spherically concaved inner wall of said depression at substantially a right angle when the engine is operating under a heavy load, and to retard the injection time and inject fuel at a time at which said fuel injected by said fuel injector and moving along said axis of injection impinges obliquely upon the spherically concaved inner wall of said depression at an acute angle, to thereby cause an impinged fuel to flow along the spherically concaved inner wall of said depression toward the point beneath said spark plug due to an inertial thereof when the engine is operating under a light load.

15. An internal combustion engine according to claim 14, wherein said axis of injection is located in said vertical plane.

16. An internal combustion engine according to claim 14, wherein said groove is smoothly connected to the lowermost bottom portion of the spherically concaved inner wall of said depression.

17. An internal combustion engine according to claim 14, wherein said spark plug enters an upper portion of said groove when said piston reaches top dead center.

18. An internal combustion engine according to claim 14, wherein the top face of said piston and the inner wall of said cylinder head defines a squish area therebetween on an opposite side of said depression.

19. An internal combustion engine according to claim 14, wherein the top face of said piston has therein a recessed portion which is located in said vertical plane beneath said spark plane, and said recessed portion is open to an upper interior of said depression.

20. An internal combustion engine according to claim 19, wherein said recessed portion has a substantially spherical shape having a radius of curvature which is smaller than that of said depression.

21. An internal combustion engine according to claim 19, wherein said spark plug enters said recessed portion when said piston reaches top dead center.

22. An internal combustion engine according to claim 14, further comprising: a pair of intake valves symmetrically arranged on the inner wall of said cylinder head with respect to a vertical plane including both said spark plug and said fuel injector; exhaust valve means arranged on the inner wall of said cylinder head; and a pair of masking walls each being formed on the inner wall of said cylinder head and arranged between said corresponding intake valve and said exhaust valve means to mask a valve opening formed between a valve seat and a peripheral portion of said corresponding intake valve, which is located on said exhaust valve means side, for the entire time for which said corresponding intake valve is open, said masking walls being symmetrically arranged with respect to said vertical plane.

23. An internal combustion engine according to claim 22, wherein said exhaust valve means comprises a pair of exhaust valves symmetrically arranged with respect to said vertical plane.

24. An internal combustion engine according to claim 22, wherein each of said masking walls is arranged close to peripheral portion of said corresponding intake valve, which is located on said exhaust valve means side, and extends downward, toward said piston to a position lower than said corresponding intake valve when said corresponding intake valve is in the maximum lift position thereof.

25. An internal combustion engine according to claim 24, wherein each of said masking walls extends in an arc along the peripheral portion of said corresponding intake valve.

26. An internal combustion engine comprising:
a cylinder head having an inner wall;
a spark plug arranged at a central portion of the inner wall of said cylinder head;
a fuel injector arranged on a peripheral portion of the inner wall of said cylinder head;
a piston having a top face having a depression extending from a point beneath said spark plug to a point beneath a tip portion of said fuel injector, fuel being injected from said fuel injector toward a concaved inner wall of said depression and the concaved inner wall of said depression having a grooved formed thereon between a lowermost bottom portion of the concaved inner wall of said depression and an upper edge of said depression which is located beneath said spark plug; and
control means for controlling an injection time of said fuel injector in response to an engine load, to inject fuel at a time at which fuel injected by said fuel injector and moving along an axis of injection impinges upon the concaved inner wall of said depression at substantially a right angle when the engine is operating under a heavy load, and to retard the injection time and inject fuel at a time at which said fuel injected by said fuel injector and moving along said axis of injection impinges obliquely upon the concaved inner wall of said depression at an acute angle, to thereby cause an impinged fuel to flow along the concaved inner wall of said depression toward the point beneath said spark plug due to an inertial thereof when the engine is operating under a light load.

27. An internal combustion engine according to claim 26, wherein said groove extends archwise around the lowermost bottom portion of the concaved inner wall.

28. An internal combustion engine according to claim 26, wherein the top face of said piston and the inner wall of said cylinder head defines a squish area therebetween on an opposite side of said depression.

29. An internal combustion engine according to claim 26, further comprising: a pair of intake valves symmetrically arranged on the inner wall of said cylinder head with respect to a vertical plane including both said spark plug and said fuel injector; exhaust valve means arranged on the inner wall of said cylinder head; and a pair of masking walls each being formed on the inner wall of said cylinder head and arranged between said corresponding intake valve and said exhaust valve means to mask a valve opening formed between a valve seat and a peripheral portion of said corresponding intake valve, which is located on said exhaust valve means side, for the entire time for which said corresponding intake valve is open, said masking walls being symmetrically arranged with respect to said vertical plane.

30. An internal combustion engine according to claim 29, wherein said exhaust valve means comprises a pair of exhaust valves symmetrically arranged with respect to said vertical plane.

31. An internal combustion engine according to claim 29, wherein each of said masking walls is arranged close to peripheral portion of said corresponding intake valve, which is located on said exhaust valve means side, and extends downward, toward said piston to a position lower than said corresponding intake valve when said corresponding intake valve is in the maximum lift position thereof.

32. An internal combustion engine according to claim 31, wherein each of said masking walls extends in an arc along the peripheral portion of said corresponding intake valve.

33. An internal combustion engine according to claim 26, wherein the concaved inner wall of said depression has a substantially spherical shape.

34. An internal combustion engine according to claim 33, wherein the concaved inner wall of said depression has a symmetrical shape with respect to a vertical plane including both said spark plug and said fuel injector.

35. An internal combustion engine according to claim 34, wherein said axis of injection is located in said vertical plane.

36. An internal combustion engine according to claim 34, wherein the top face of said piston has therein a recessed portion which is located in said vertical plane beneath said spark plane, and said recessed portion is open to an upper interior of said depression.

37. An internal combustion engine according to claim 36, wherein said recessed portion has a substantially spherical shape having a radius of curvature which is smaller than that of said depression.

38. An internal combustion engine according to claim 36, wherein said spark plug enters said recessed portion when said piston reaches top dead center.

* * * * *

UNITED STATES PATENT AND TRADEMARK OFFICE
CERTIFICATE OF CORRECTION

PATENT NO. : 5,127,379

DATED : July 7, 1992

INVENTOR(S) : Tatsuo Kobayashi; Norihiko Nakamura; Kenichi Nomura; Hiroshi Nomura; and Hiroaki Nihei It is certified that error appears in the above-identified patent and that said Letters Patent is hereby corrected as shown below:

ON THE COVER PAGE:

In section [75] Inventors:

change "Hiroshi Nihei" to --Hiroaki Nihei--.

Signed and Sealed this

Twenty-third Day of November, 1993

Attest:

BRUCE LEHMAN

Attesting Officer     Commissioner of Patents and Trademarks